Figure 1:
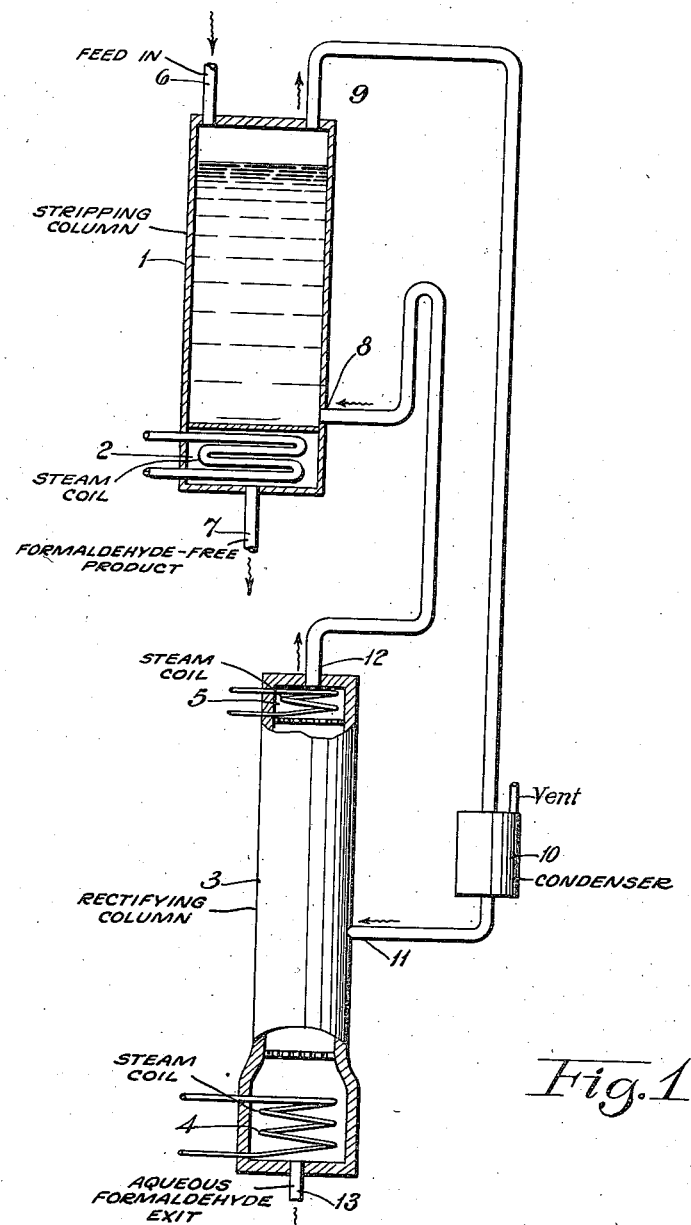

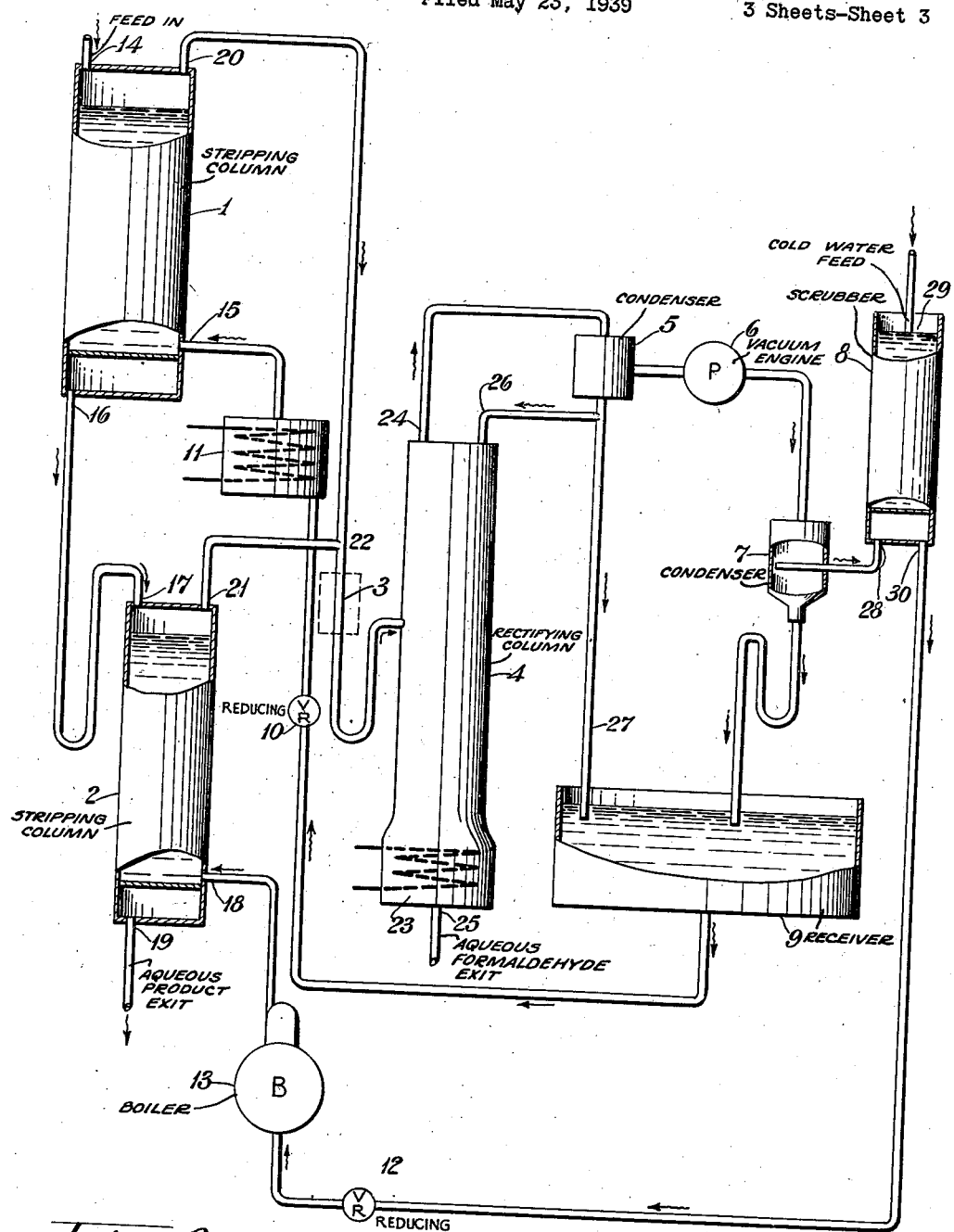

Patented July 29, 1941

2,251,081

UNITED STATES PATENT OFFICE 2,251,081

PURIFICATION OF HYDROXY-ALDEHYDES AND HYDROXY-KETONES

Arthur William Charles Taylor and James William Woolcock, Norton-on-Tees, and Ames Gresley Hellicar, Ipswich, England, assignors to Imperial Chemical Industries Limited, a corporation of Great Britain Application May 23, 1939, Serial No. 275,134
In Great Britain May 23, 1938

5 Claims. (Cl. 202—48)

This invention relates to the purification of organic substances and more particularly to the removal of formaldehyde from aqueous solutions of hydroxy-aldehydes and/or hydroxy-ketones.

It has been found that hydroxy-aldehydes and hydroxy-ketones can be hydrogenated with far less consumption of catalyst if they are separated from the formaldehyde which is usually present from their process of manufacture. Substantially complete removal of formaldehyde from the above mentioned solutions offers considerable difficulties. The usual method, namely, distillation, is not applicable since the boiling point of the constant boiling mixture of formaldehyde and water is above the decomposition temperature of many hydroxy-aldehydes and hydroxy-ketones. Chemical methods of removal involving the formation of an insoluble formaldehyde compound have the disadvantage of high cost and do not ensure substantially complete removal.

This invention has as an object to devise a new method of removing formaldehyde from aqueous solutions of hydroxy-aldehydes and/or hydroxy ketones. A further object is to devise such a new method which will be economical and effective. Further objects will appear hereinafter. These objects are accomplished by the following invention.

We have now found that formaldehyde may be substantially completely removed from the said solutions by distillation in the presence of suitable quantities of the vapour of methyl alcohol and/or ethyl alcohol. By this method substantially all the formaldehyde may be removed at a temperature below that at which the decomposition of hydroxy-aldehydes and hydroxy-ketones takes place. Substantially the whole of the water may also be removed during the same operation.

One suitable procedure for carrying out the invention is as follows. For convenience the word "alcohol" is used throughout the following description to denote methyl or ethyl alcohol or mixtures thereof.

A solution of hydroxy-aldehydes and/or hydroxy-ketones containing formaldehyde is supplied to the top of a stripping column of known type, and a stream of alcohol vapour or liquid alcohol is supplied to the bottom of the same column. The base of this stripping column may be fitted with a steam coil or other convenient form of heater for the purpose of re-vaporising the liquid alcohol which collects there. By suitably adjusting the relative rates of flow of raw solution and of alcohol it is readily possible to remove all the formaldehyde and to withdraw purified hydroxy-aldehydes and/or hydroxy-ketones in substantially dry alcohol from the base of the stripping column. The relative rates of flow of raw solution and of alcohol will depend upon the composition of the raw solution and should be determined for each new raw material, which may be done by simple preliminary experiments. The relative rates of flow will of course be different for methyl and ethyl alcohols and any mixture thereof that may be used.

The formaldehyde and water vapour pass out of the top of the stripping column together with alcohol vapour. This vapour mixture, if desired, may be passed via a condenser direct to a rectifying column of known type where the alcohol is separated from the water and formaldehyde, and issues from the top of said column, whence it may be passed directly back to the stripping column. Dilute aqueous formaldehyde is obtained from the base of the rectifying column.

Figure 2:
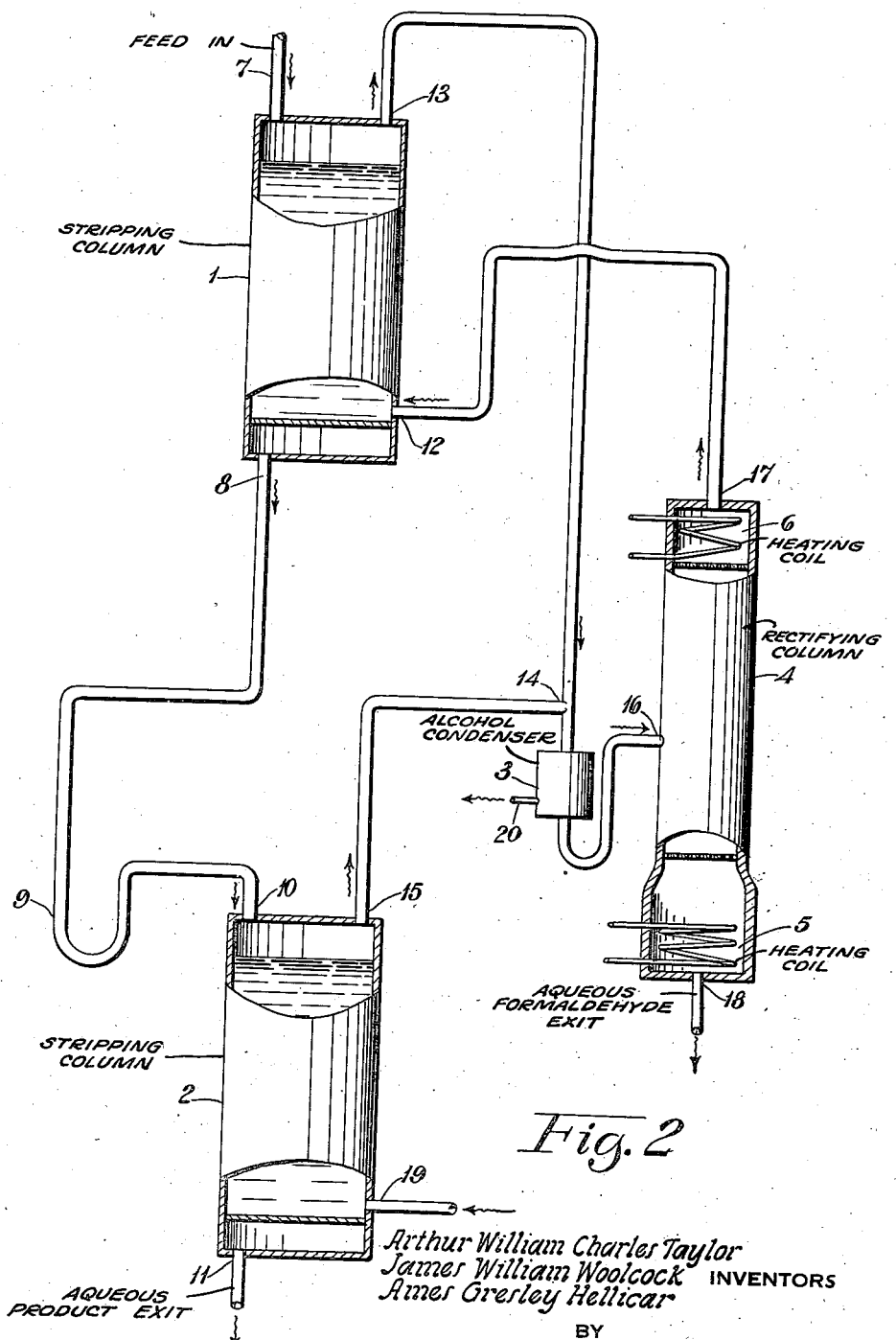

Particular methods of removing the formaldehyde are illustrated in the accompanying drawings, in which Figures 1, 2 and 3 are diagrammatic flow sheets.

In Figure 1 reference numeral 1 represents a stripping column provided with steam coil 2, and 3 represents a rectifying column provided with steam coil 4 and reflux coil 5. Raw solution enters at 6 and alcohol vapour at 8. Alcohol vapour together with formaldehyde and water leaves the stripping column at 9, passes through condenser 10 and enters the rectifying column at 11. Rectified alcohol vapour leaves the rectifying column at 12 and is returned to the stripping column at 8. Aqueous formaldehyde is obtained from the rectifying column at 13 and purified hydroxy-ketones and/or hydroxy-aldehydes in alcohol solution leave the stripping column at 7. If desired, the whole operation may be conducted under reduced pressure, by applying a suitable source of vacuum at the condenser 10.

This method yields the hydroxy-aldehydes and/or hydroxy-ketones as a substantially dry solution in either methyl or ethyl alcohol, according to the vapour used for stripping. If the hydroxy-aldehydes and/or hydroxy-ketones are particularly heat sensitive, the heating coil 2 at the base of the stripping column may be omitted, but in this case, a far more dilute solution of the product will be obtained.

Frequently it is desirable, particularly where the hydroxy-aldehydes and/or hydroxy-ketones are later to be hydrogenated, to obtain the product not as an alcoholic solution but as an aqueous solution. In such circumstances we have found that a second stripping column, in which the alcohol is removed by means of steam, may be readily incorporated in the apparatus in such a manner that no appreciable decomposition of the products occurs and no alcohol is withdrawn from the system apart from that due to minor leakages and other operating losses. This method of working is illustrated in Figure 2, in which reference numeral 1 represents a stripping column for formaldehyde, and 2 a stripping column for alcohol. 3 represents a condenser for alcohol vapour and 4 a rectifying column fitted with heating coil 5 and reflux coil 6.

In operation, raw solution enters the formaldehyde stripper at 7 to which alcohol vapour is supplied at 12. The solution substantially free from formaldehyde, leaves the stripper at 8, and passes via the lute 9 to the alcohol stripper 2 at 10. Steam is supplied to this stripper at 10, and the product leaves at 11 as an aqueous solution substantially free from alcohol. Alcohol vapour, together with formaldehyde and water leave column 1 at 13 and alcohol and water vapour leave column 2 at 15. These two sources converge at the point 14, after which they pass through the condenser 3. A liquid mixture of alcohol, water and formaldehyde leaves the condenser and passes via a lute to the rectifying column 4 at 10. From the top of the rectifying column, alcohol vapour leaves at 17, and is returned to column 1 at 12. From the base of the rectifying column, dilute aqueous formaldehyde is obtained at 18.

If desired, the whole process may be operated under suitably reduced pressure, in which case vacuum may be applied by any known means to the condenser 3 at 20. If the process be operated at atmospheric pressure, the point 20 is connected to a vent to atmosphere.

Whilst the method of Figure 2 represents a very satisfactory method of removing the alcoholic stripping agent, we have found that still further improvements can be made whereby the small losses of formaldehyde and alcohol which occur via the vent or vacuum line 20, may be completely eliminated. This improved method of operation is illustrated in Figure 3, in which reference numeral 1 represents the formaldehyde stripper, 2 the alcohol stripper, 4 the rectifying column, 5 a condenser for alcohol, 6 a vacuum engine of any known type, 7 a further condenser for alcohol, 8 a scrubber, and 9 a vessel containing liquid alcohol.

In operation, raw solution enters column 1 at 14, and is stripped of formaldehyde by alcohol vapour supplied at 15. The stripped solution leaves column 1 at 16, and passes via a lute to the alcohol stripper 2 at 17. Steam from a boiler 13 is supplied to column 2 at 18 and the product leaves at 19 in the form of an aqueous solution substantially free from both formaldehyde and alcohol. From column 1, alcohol together with water and formaldehyde, leaves at 20, whilst alcohol and water vapour leave column 2 at 21. These two lines combine at point 22 and then pass via an optional condenser 3 and a lute to the rectifying column 4. The column is provided with a heating coil 23, and alcohol vapour leaves at 24, whilst dilute aqueous formaldehyde collects at the base and leaves at 25. The vapour leaving at 24 passes to a condenser 5 from which the flow of liquid alcohol is divided, part passing back to form a reflux to the rectifier at 26, the remainder flowing via an atmospheric leg 27 to the vessel 9. The condenser 5 is also connected to the vacuum engine 6, the exhaust of which connects to a condenser 7 where a further quantity of alcohol is condensed and flows via a lute to the vessel 9. Any vapour not condensed in 7 passes into the scrubber 8 at 28. This scrubber may be of any known packed type. Cold water supplied at 29 trickles down the packing and dissolves any alcohol vapours still remaining. The scrubbing water employed leaves 8 at 30 and passes via a let-down valve 12 to a boiler 13 where it serves to generate steam for the alcohol stripper. Liquid alcohol from the vessel 9 is fed, via a let-down valve 10 to a boiler 11, where it is vaporised for re-supply to the formaldehyde stripper. The vacuum engine may be adapted to give any desired pressure, but we have found in practice that a vacuum of about half an atmosphere is very suitable.

The following example illustrates but does not limit the invention.

*Example*

Employing the apparatus described in conjunction with Figure 3, 10 litres/hour of a mixture of formaldehyde methanol, water, and hydroxy-aldehydes and hydroxy-ketones are fed continuously to the formaldehyde stripper 1, at point 14. The composition of this feed is 31.2% hydroxy-aldehydes and hydroxy-ketones, 5.2% formaldehyde, 8.5% methanol, 55.1% water. Methanol vapour is supplied by the boiler 11 to the formaldehyde stripper 1 at point 15 at a rate of 93.6 kg./hr.

21.6 kgs./hr. of stripped solution leaves the formaldehyde stripper at 16 and pass via a lute to the alcohol stripper 2 at 17. The composition of this stripped solution is 14.3% hydroxy-aldehydes, 1% water, and 84.6% methanol, with approximately 0.1% formaldehyde. Steam from the boiler 13 is supplied to column 2 at 18 at a rate of 20 kg./hr. The product (16.1 kg./hr.) leaves at 19 as an aqueous solution substantially free of formaldehyde and methanol and containing 22% of hydroxy-aldehydes and hydroxy-ketones.

From column 1, methanol together with water and formaldehyde, leaves at 20 at a rate of 82.6 kg./hr.; the composition is 0.6% formaldehyde, 92% methanol, 7.4% water. From column 2, methanol and water vapour leave at 21 at a rate of 25.3 kg./hr.; the composition is 72.3% methanol, 27.7% water. These two vapour quantities combine at point 22 and then pass via a lute to the rectifying column 4. The column is provided with a heating point 23 and is of adequate dimension to separate water and formaldehyde from methanol. The methanol vapour leaves at 24 and passes to a condenser 5 from which the flow of liquid is divided, three parts passing back to form a reflux to the rectifier at 26, and one part (90 kg./hr.) flowing via an atmospheric leg 27 to the vessel 9. The condenser 5 is connected to the vacuum engine 6, so that the whole system operates at approximately 350 mm. mercury absolute. The exhaust of this vacuum engine is connected to a condenser 7 where a further 4 kg./hr. of methanol is condensed. This flows by a lute to the vessel 9.

Approximately 0.4 kg./hr. of methanol which is not condensed in 7 passes into the scrubber 8 at 28. Cold water at a rate of 20 kg./hr. is supplied at 29, trickles down the packing and dissolves the methanol remaining in the gas. This water leaves 8 at 30 and passes via a let-down valve 12 to a boiler 13, where, after vaporisation, it serves column 2 with steam.

The product from the bottom of the rectifier 4 leaves at 25 at a rate of 19.3 kg./hr. as a 2.6% aqueous solution of formaldehyde. Methanol is fed back to the system from vessel 9 through the let-down valve 10 to the boiler 11 at a rate of 93.6 kg./hr. The excess methanol 0.8 kg./hr. is withdrawn from the system.

As many apparently widely different embodiments of this invention may be made without departing from the spirit and scope thereof, it is to be understood that the invention is not limited to the specific embodiments thereof except as defined in the appended claims.

We claim:

1. The process for removing formaldehyde from aqueous solutions of hydroxyaldehydes and hydroxyketones, which comprises passing a vaporized alcohol of not more than two carbon atoms into the said formaldehyde-containing aqueous solution of hydroxy aldehydes and hydroxy ketones, continuing the passage of the said vaporized alcohol into the said aqueous solution until substantially all of the contained formaldehyde has been evolved as a vapor together with the water present, and recovering a purified alcoholic solution of hydroxy aldehydes and hydroxy ketones which purified solution is substantially free from formaldehyde.

2. The process for removing formaldehyde from aqueous solutions of hydroxyaldehydes and hydroxyketones, which comprises stripping the formaldehyde-containing, aqueous solution of hydroxyaldehydes and hydroxyketones with a vaporized alcohol of not more than two carbon atoms, whereby the formaldehyde is removed from the said solution without substantial decomposition of the hydroxyaldehydes and hydroxyketones.

3. The process of removing formaldehyde from aqueous solutions of hydroxyaldehydes and hydroxyketones which comprises passing an excess of vaporized methanol into the formaldehyde-containing, aqueous solution of hydroxyaldehydes and hydroxyketones, continuing the passage of vaporized methanol into the said solution until substantially all of the contained formaldehyde is vaporized, collecting a primary vapor fraction containing methanol, water, and substantially all of the formaldehyde, drawing off a primary liquid product containing hydroxyaldehydes and hydroxyketones admixed with methanol, passing steam into the primary liquid product to strip out the methanol, leaving a final liquid product composed of an aqueous solution of hydroxyaldehydes and hydroxyketones, combining the primary vapor fraction from the methanol-stripping step with the vapors from the steam-stripping step, rectifying the combined vapors to separate dilute aqueous formaldehyde from recovered methanol, and passing the recovered methanol into additional formaldehyde-containing, aqueous solutions of hydroxyaldehydes and hydroxyketones as before.

4. The process of claim 3 when conducted at an absolute pressure below atmospheric with the further steps of condensing the recovered methanol and washing the gases exhausted from the recovered methanol condensation with cold, feed water for the steam-stripping step.

5. The process for purifying aqueous hydroxyaldehydes and hydroxyketones without substantial decomposition thereof, which comprises passing vaporized methanol into the said aqueous solutions of hydroxyaldehydes and hydroxyketones until substantially all of the formaldehyde impurity has been stripped from the said solutions.

ARTHUR WILLIAM CHARLES TAYLOR.
JAMES WILLIAM WOOLCOCK.
AMES GRESLEY HELLICAR.